(12) United States Patent
Hanna et al.

(10) Patent No.: US 9,561,974 B2
(45) Date of Patent: Feb. 7, 2017

(54) COMPOSITION AND SYSTEM FOR FLOCCULATING OR SETTLING SOLIDS FROM LIQUIDS AND METHODS FOR USING SAME

(75) Inventors: Gerald Hanna, Sherwood Park (CA); Alberto Valdes, Calgary (CA)

(73) Assignee: Clearflow Group Inc., Sherwood Park, AB (CA)

( * ) Notice: Subject to any disclaimer, the term of this patent is extended or adjusted under 35 U.S.C. 154(b) by 379 days.

(21) Appl. No.: 13/979,736

(22) PCT Filed: Jan. 17, 2012

(86) PCT No.: PCT/CA2012/000051
§ 371 (c)(1),
(2), (4) Date: Jul. 15, 2013

(87) PCT Pub. No.: WO2012/097442
PCT Pub. Date: Jul. 26, 2012

(65) Prior Publication Data
US 2013/0292342 A1 Nov. 7, 2013

Related U.S. Application Data

(60) Provisional application No. 61/433,433, filed on Jan. 17, 2011, provisional application No. 61/524,687, filed on Aug. 17, 2011.

(51) Int. Cl.
*C02F 1/00* (2006.01)
*B01D 37/00* (2006.01)
(Continued)

(52) U.S. Cl.
CPC .............. *C02F 1/56* (2013.01); *B01D 21/01* (2013.01); *C02F 1/5245* (2013.01); *C02F 1/54* (2013.01);
(Continued)

(58) Field of Classification Search
None
See application file for complete search history.

(56) References Cited

U.S. PATENT DOCUMENTS 3,085,916 A   4/1963  Zimmie et al.
3,860,526 A   1/1975  Corbett
(Continued)

FOREIGN PATENT DOCUMENTS

| GB | 2 021 551 A | 12/1979 |
| GB | 2 025 922 A | 1/1980 |
| GB | 2 025 922 B | 1/1980 |

OTHER PUBLICATIONS

Kahi Ern Lee et al. "Flocculation of Kaolin in Water Using Novel Calcium Chloride-Polyacrylamide (CaC12-PAM) Hybrid Polymer", Separation and Purification Technology, 75/3, Nov. 20, 2010, p. 346-351 to Follow.
(Continued)

*Primary Examiner* — Ana Fortuna
(74) *Attorney, Agent, or Firm* — Davis & Bujold PLLC; Michael J. Bujold

(57) ABSTRACT

A system and method for treating water or sewage is provided. The system can include a screening tank, a septic tank, a flocculant and mixing reactor, a primary clarifier, a secondary clarifier, a sludge dewatering tank, a surge tank, one or more filter tanks and a disinfection tank. The method can include the steps of receiving water or sewage to be treated and passing it through a screening tank and septic tank, a flocculant reactor, a primary clarifier, a secondary clarifier, a sludge dewatering tank, a surge tank, one or more filter tanks and a disinfection tank.

62 Claims, 8 Drawing Sheets

(51) Int. Cl.
*B01D 21/01* (2006.01)
*B01D 63/00* (2006.01)
*C02F 1/56* (2006.01)
*C02F 9/00* (2006.01)
*E21B 21/06* (2006.01)
*C02F 1/54* (2006.01)
*C02F 1/52* (2006.01)
*C02F 103/10* (2006.01)

(52) U.S. Cl.
CPC ............... *C02F 9/00* (2013.01); *E21B 21/065* (2013.01); *C02F 1/5236* (2013.01); *C02F 2001/007* (2013.01); *C02F 2103/10* (2013.01); *C02F 2201/006* (2013.01); *C02F 2209/006* (2013.01)

(56) References Cited

U.S. PATENT DOCUMENTS

| | | | |
|---|---|---|---|
| 4,457,842 A | | 7/1984 | Bereiter |
| 4,610,801 A | * | 9/1986 | Matthews ............ C02F 1/5227 162/168.3 |
| 4,710,298 A | * | 12/1987 | Noda ..................... B01D 37/02 210/505 |
| 5,720,886 A | | 2/1998 | Iwinski |
| 5,795,620 A | | 8/1998 | Iwinski |
| 7,070,693 B2 | * | 7/2006 | Kelly ........................ A61L 2/10 210/609 |
| 8,062,518 B2 | | 11/2011 | Hanna |

OTHER PUBLICATIONS

International Search Report issued in corresponding PCT application mailed on May 2, 2012.

\* cited by examiner

COMPOSITION AND SYSTEM FOR FLOCCULATING OR SETTLING SOLIDS FROM LIQUIDS AND METHODS FOR USING SAME

CROSS-REFERENCE TO RELATED APPLICATIONS

This application is a National Stage Completion of PCT/CA2012/000051 filed Jan. 17, 2012 which claims priority of U.S. provisional patent application Ser. Nos. 61/433,433 filed Jan. 17, 2011 and 61/524,687 filed Aug. 17, 2011, and hereby incorporates these same provisional applications by reference herein in their entirety. This application is a National Stage Completion of PCT/CA2012/000051 filed Jan. 17, 2012.

TECHNICAL FIELD

The present disclosure is related to the field of compositions used for flocculating or settling solids suspended in liquids, the methods used in manufacturing such composition, and the use of such compositions in reactors for flocculating solids suspended in liquids. The present disclosure is further related to the field of systems and methods used in the treatment of water, in particular, systems and methods used in the treatment and clarification of waste water, sewage or industrial effluent.

BACKGROUND

Water and liquids used in construction, industrial, mining and well drilling operations can contain suspended solids after being used. In some instances, governmental laws and regulations can require that the removal of the suspended solids must be carried out before the water or liquids can be liquids, once the solids have been removed, can reduce the costs of the operation by re-using the liquids instead of discarding the liquids and using new or fresh liquids at a higher cost.

Waste water and sewage can contain suspended solids. In some instances, governmental laws and regulations can require that the removal of the suspended solids must be carried out before the water or liquids can be introduced into the environment. In other instances, the recovery of the liquids, once the solids have been removed, can reduce the costs of the operation by re-using the liquids instead of discarding the liquids and using new or fresh liquids at a higher cost.

U.S. Pat. No. 3,085,916 issued to Zimmie et al. on Apr. 16, 1963, which is incorporated by reference into this application in its entirety, describes a method of flocculating and preventing the accumulation of solids or silt in cooling systems by introducing water-soluable polyelectrolytic organic polymers into aqueous cooling systems.

U.S. Pat. No. 3,860,526 issued to Corbett on Jan. 14, 1975, which is incorporated by reference into this application in its entirety, describes a solid flocculant that can be placed into an effluent stream or body of water to release flocculant into the stream or water at a controlled rate.

U.S. Pat. No. 5,720,886 issued to Iwinski on Feb. 24, 1998, which is incorporated by reference into this application in its entirety, describes a process for using polymer to remove dissolved and particulate metal from mine waste water.

U.S. Pat. No. 5,795,620 issued to Iwinski on Aug. 18, 1998, which is incorporated by reference into this application in its entirety, describes the coating of waste rock with polymer to retard the leaching of metal from the waste rock.

The shortcomings of the prior art are that they do not provide a cost-effective and efficient method of flocculating or settling of solids suspended in liquids. In addition, the prior art concerning waste water treatment systems does not provide a cost-effective and efficient method of flocculating or settling of solids suspended in liquids, as these prior art methods and systems can take 2 to 5 weeks to clarify water using microbial reactions.

It is, therefore, desirable to provide a composition and a method of using the composition that overcomes the shortcomings of the prior art, and to provide a system and a method of treating water and, in some embodiments, sewage that overcomes the shortcomings of the prior art.

SUMMARY

A composition for flocculating or settling solids suspended in liquids is provided. In some embodiments, the composition can comprise a polymer, a soluble salt of a group IA metal or a soluble salt of a group IIA metal of the periodic table, and water. In other embodiments, the soluble salt of a group IA metal or the soluble salt of a group IIA metal can be formed by combining a salt of a group IA metal or a salt of a group IIA metal with a mineral acid or an organic acid.

In some embodiments, the composition can be manufactured by first combining the polymer and the alkaline earth metal soluble salt, and then adding the water.

In some embodiments, a cartridge is provided for use in flocculating or settling solids suspended in liquids. The cartridge can comprise an outer sidewall and inner sidewall wherein the composition can be disposed therebetween. The outer and inner sidewalls can further comprise perforations wherein liquids flowing around the cartridge can contact the composition through the perforations and cause the composition to dissolve and enter into the liquids.

In some embodiments, a reactor is provided for flocculating or settling solids suspended in liquids. The reactor can comprise a housing configured to house a cartridge comprising the composition, the reactor further comprising an inlet and an outlet wherein liquids containing suspended solids can enter through the inlet and flow around the cartridge to contact the composition and exit through the outlet.

In some embodiments, a reactor system is provided for flocculating or settling solids suspended in liquids, the system comprising a plurality of reactors configured in a series, a parallel or a series/parallel configuration.

Broadly stated, in some embodiments, a composition is provided for flocculating or settling solids suspended in liquids, comprising: a polymer flocculant comprising a high molecular weight, in a proportion of approximately 10% to 70% by weight; a soluble salt of a group IA metal or a soluble salt of a group IIA metal, in a proportion of approximately 0.5% to 35% by weight; and water, in a proportion to make up the balance of 100% weight.

Broadly stated, in some embodiments, a use of a composition is provided for the settling of solids suspended in liquids, the composition comprising: a polymer flocculant comprising a high molecular weight, in a proportion of approximately 10% to 70% by weight; a soluble salt of a group IA metal or a soluble salt of a group IIA metal, in a proportion of approximately 0.5% to 35% by weight; and water, in a proportion to make up the balance of 100% weight.

Broadly stated, in some embodiments, a method for manufacturing a composition for flocculating or settling solids suspended in liquids, the method comprising the steps of: providing approximately 10% to 70% by weight of a polymer flocculant comprising a high molecular weight; adding approximately 0.5% to 35% by weight of a soluble salt of a group IA metal or a soluble salt of a group IIA metal; and adding water to make up a balance of 100% weight.

Broadly stated, in some embodiments, a cartridge is provided for use in flocculating or settling solids suspended in liquids, the cartridge comprising; an outer sidewall; an inner sidewall; a composition disposed between the outer and inner sidewalls, the composition comprising: a polymer flocculant comprising a high molecular weight, in a proportion of approximately 10% to 70% by weight, a soluble salt of a group IA metal or a soluble salt of a group IIA metal, in a proportion of approximately 0.5% to 35% by weight, and water, in a proportion to make up the balance of 100% weight; and a plurality of perforations disposed through one or both of the outer and inner sidewalls.

Broadly stated, in some embodiments, a method is provided for flocculating or settling solids suspended in liquids, the method comprising the steps of: providing a reactor housing, the reactor housing comprising an inlet, an outlet and an enclosed chamber having communication with the inlet and outlet; providing a composition, and placing the composition in the chamber, the composition comprising: a polymer flocculant comprising a high molecular weight, in a proportion of approximately 10% to 70% by weight, a soluble salt of a group IA metal or a soluble salt of a group IIA metal, in a proportion of approximately 0.5% to 35% by weight, and water, in a proportion to make up the balance of 100% weight; and passing liquids comprising suspended solids into the inlet, wherein the liquids can contact the composition before exiting the reactor housing through the outlet.

Broadly stated, in some embodiments, a method is provided for flocculating solids from drilling fluids, the method comprising the steps of: providing a reactor housing, the reactor housing comprising an inlet, an outlet and an enclosed chamber having communication with the inlet and outlet; providing a composition, and placing the composition in the chamber, the composition comprising: a polymer flocculant comprising a high molecular weight, in a proportion of approximately 10% to 70% by weight, a soluble salt of a group IA metal or a soluble salt of a group IIA metal, in a proportion of approximately 0.5% to 35% by weight, and water, in a proportion to make up the balance of 100% weight; receiving drilling fluid containing solids from a well; directing the drilling fluid into the inlet, wherein the drilling fluid can contact and react with the composition before exiting the reactor housing through the outlet; and directing the drilling fluid exiting from the outlet to a holding tank wherein the solids can settle from the drilling fluid.

Broadly stated, in some embodiments, a reactor system is provided for flocculating or settling solids suspended in liquids, comprising: at least one reactor housing, the at least one reactor housing comprising an inlet, an outlet and an enclosed chamber having communication between the inlet and outlet; a cartridge disposed in the enclosed chamber; and the cartridge comprising an outer sidewall, an inner sidewall and a composition disposed between the outer and inner sidewalls, the composition comprising: a polymer flocculant comprising a high molecular weight, in a proportion of approximately 10% to 70% by weight, a soluble salt of a group IA metal or a soluble salt of a group IIA metal, in a proportion of approximately 0.5% to 35% by weight, and water, in a proportion to make up the balance of 100% weight.

Broadly stated, in some embodiments, a system is provided for treating waste water comprising suspended solids, the system comprising: a screening tank configured to receive the waste water; at least one septic tank configured to receive the waste water from the screening tank; a mixing reactor configured to receive the waste water from the at least one septic tank; a flocculant tank configured to inject flocculant into the mixing reactor wherein the flocculant mixes with the waste water; a primary clarifier configured to receive the waste water mixed with the flocculant from the mixing reactor wherein at least some of the suspended solids disposed in the waste water settle in the primary clarifier to produce first clarified waste water and first settled solids; a secondary clarifier configured to receive the first clarified waste water from the primary clarifier wherein at least some of the suspended solids disposed in the first clarified water settle in the secondary clarifier to produce second clarified waste water and second settled solids; a surge tank configured to receive the second clarified waste water from the secondary clarifier; and at least one filter tank configured to receive the second clarified waste water from the surge tank wherein the second clarified waste water is filtered to produce treated waste water.

In some embodiments, the system can further comprise a flocculant reactor operatively connected to the primary clarifier wherein at least some of the waste water disposed in the primary clarifier passes through the flocculant reactor and fed back into the primary clarifier. In some embodiments, the system can further comprise a disinfection and surge tank configured to receive the treated waste water from the at least one filter tank wherein the treated waste water is disinfected. In some embodiments, the system can further comprise a sludge storage tank configured to receive one or both of the first settled solids from the primary clarifier and the second settled solids from the secondary clarifier. In some embodiments, the system can further comprise a sludge dewatering tank configured to receive settled solids from the sludge storage tank and to remove water from the settled solids.

Broadly stated, in some embodiments, a method is provided for treating waste water comprising suspended solids, the method comprising the steps of: passing the waste water through a screening tank; passing the screened waste water through at least one septic tank; passing the screened waste water from the septic tank through a mixing reactor; injecting flocculant into the mixing reactor wherein the flocculant mixes with the screened waste water; passing the screened waste water from the mixing reactor through a primary clarifier wherein at least some of the suspended solids disposed in the screened waste water settle in the primary clarifier to produce first clarified waste water and first settled solids; passing the first clarified waste water through a secondary clarifier wherein at least some of the suspended solids disposed in the first clarified waste water settle in the secondary clarifier to produce second clarified waste water and second settled solids; passing the second clarified waste water through a surge tank; and passing the second clarified waste water through at least one filter tank wherein the second clarified waste is filtered to produce treated waste water.

In some embodiments, the method can further comprise the step of passing at least some of the screened waste water disposed in the primary clarifier through a flocculant reactor and back into the primary clarifier. In some embodiments, the method can further comprise the step of passing the treated sewage through a disinfection and surge tank wherein the treated waste water is disinfected. In some embodiments, the method can further comprise the step of passing one or both of the first settled solids from the primary clarifier and the second settled solids from the secondary clarifier to a sludge storage tank. In some embodiments, the method can further comprise the step of removing water from the settled solids disposed in the sludge storage tank.

Broadly stated, in some embodiments, a system is provided for treating waste water comprising suspended solids, the system comprising: means for passing the waste water through a screening tank; means for passing the screened waste water through at least one septic tank; means for passing the waste water from the septic tank through a mixing reactor; means for injecting flocculant into the mixing reactor wherein the flocculant mixes with the waste water; means for passing the waste water from the mixing reactor through a primary clarifier wherein at least some of the suspended solids settle in the primary clarifier to produce first clarified waste water and first settled solids; means for passing the first clarified waste water through a secondary clarifier wherein at least some of the suspended solids settle in the secondary clarifier to produce second clarified waste water and second settled solids; means for passing the second clarified waste water through a surge tank; and means for passing the second clarified waste water through at least one filter tank wherein the second clarified waste is filtered to produce treated waste water.

In some embodiments, the system can further comprise means for passing at least some of the waste water in the primary clarifier through a flocculant reactor and back into the primary clarifier. In some embodiments, the system can further comprise means for passing the treated waste water through a disinfection and surge tank wherein the treated waste water is disinfected. In some embodiments, the system can further comprise means for passing one or both of the first settled solids from the primary clarifier and the second settled solids from the secondary clarifier to a sludge storage tank. In some embodiments, the system can further comprise means for removing water from the settled solids disposed in the sludge storage tank.

Broadly stated, in some embodiments a system is provided for treating sewage comprising suspended solids, comprising: a screening tank configured to receive the sewage; at least one septic tank configured to receive the sewage from the screening tank; a mixing reactor configured to receive the sewage from the at least one septic tank; a flocculant tank configured to inject flocculant into the mixing reactor wherein the flocculant mixes with the sewage; a primary clarifier configured to receive the sewage mixed with the flocculant from the mixing reactor wherein at least some of the suspended solids disposed in the sewage settle in the primary clarifier to produce first clarified sewage and first settled solids; a secondary clarifier configured to receive the first clarified sewage from the primary clarifier wherein at least some of the suspended solids disposed in the first clarified sewage settle in the secondary clarifier to produce second clarified sewage and second settled solids; a surge tank configured to receive the second clarified sewage from the secondary clarifier; and at least one filter tank configured to receive the second clarified sewage from the surge tank wherein the second clarified sewage is filtered to produce treated sewage.

In some embodiments, the system can further comprise a flocculant reactor operatively connected to the primary clarifier wherein at least some of the sewage disposed in the primary clarifier passes through the flocculant reactor and fed back into the primary clarifier. In some embodiments, the system can further comprise a disinfection and surge tank configured to receive the treated sewage from the at least one filter tank wherein the treated waste water is disinfected. In some embodiments, the system can further comprise a sludge storage tank configured to receive one or both of the first settled solids from the primary clarifier and the second settled solids from the secondary clarifier. In some embodiments, the system can further comprise a sludge dewatering tank configured to receive settled solids from the sludge storage tank and to remove water from the settled solids.

Broadly stated, in some embodiments, a method is provided for treating sewage comprising suspend solids, the method comprising the steps of: passing the sewage through a screening tank; passing the screened sewage through at least one septic tank; passing the screened sewage from the septic tank through a mixing reactor; injecting flocculant into the mixing reactor wherein the flocculant mixes with the screened sewage; passing the screened sewage from the mixing reactor through a primary clarifier wherein at least some of the suspended solids disposed in the screened sewage settle in the primary clarifier to produce first clarified sewage and first settled solids; passing the first clarified sewage through a secondary clarifier wherein at least some of the suspended solids disposed in the first clarified sewage settle in the secondary clarifier to produce second clarified sewage and second settled solids; passing the second clarified sewage through a surge tank; and passing the second clarified sewage through at least one filter tank wherein the second clarified waste is filtered to produce treated sewage.

In some embodiments, the method can further comprise the step of passing at least some of the screened sewage disposed in the primary clarifier through a flocculant reactor and back into the primary clarifier. In some embodiments, the method can further comprise the step of passing the treated sewage through a disinfection and surge tank wherein the treated sewage is disinfected. In some embodiments, the method can further comprise the step of passing one or both of the first settled solids from the primary clarifier and the second settled solids from the secondary clarifier to a sludge storage tank. In some embodiments, the method can further comprise the step of removing water from the settled solids disposed in the sludge storage tank.

Broadly stated, in some embodiments, a system is provided for treating sewage comprising suspended solids, the system comprising: means for passing the sewage through a screening tank; means for passing the screened sewage through at least one septic tank; means for passing the screened sewage from the septic tank through a mixing reactor; means for injecting flocculant into the mixing reactor wherein the flocculant mixes with the screened sewage; means for passing the screened sewage from the mixing reactor through a primary clarifier wherein at least some of the suspended solids disposed in the screened sewage settle in the primary clarifier to produce first clarified sewage and first settled solids; means for passing the first clarified sewage through a secondary clarifier wherein at least some of the suspended solids disposed in the first clarified sewage settle in the secondary clarifier to produce second clarified sewage and second settled solids; means for passing the second clarified sewage through a surge tank; and means for passing the second clarified sewage through at least one filter tank wherein the second clarified waste is filtered to produce treated sewage.

In some embodiments, the system can further comprise means for passing at least some of the screened sewage disposed in the primary clarifier through a flocculant reactor and back into the primary clarifier. In some embodiments, the system can further comprise means for passing the treated sewage through a disinfection and surge tank wherein the treated sewage is disinfected. In some embodiments, the system can further comprise means for passing one or both of the first settled solids from the primary clarifier and the second settled solids from the secondary clarifier to a sludge storage tank. In some embodiments, the system can further comprise means for removing water from the settled solids disposed in the sludge storage tank.

DETAILED DESCRIPTION OF EMBODIMENTS

Figure 3:
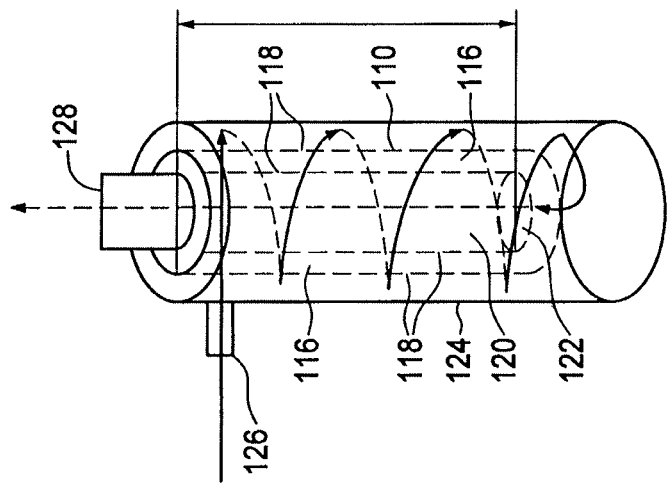
FIG. 3 is an inverted perspective view depicting a reactor housing comprising the cartridge of FIG. 1.

In some embodiments, a composition is provided for flocculating or settling solids suspended in liquids. The composition can be a flocculant in solid or gelatinous form that can dissolve into liquids. When liquids containing suspended solids contact the composition, the composition can dissolve thereby releasing flocculant into the liquid to contact the suspended solids. The suspended solids, having been contacted with the flocculant, can clump together and then settle from the liquids.

In some embodiments, the composition can comprise a polymer or polymeric flocculant, which can further comprise a macromolecular organic component and have a high molecular weight. Suitable examples can include those described in U.S. Patent Nos. 3,085,916 and 3,860,526, incorporated by reference herein. The proportion of the polymer in the composition can be in the range of approximately 10% to 70% by weight. The composition can further comprise any suitable soluble salt of a group IA metal or of a group IIA metal of the periodic table as well known to those skilled in the art, the proportion of which can be in the range of approximately 0.5% to 35% by weight. Examples of suitable soluble salts can include those disclosed in the above-mentioned patents. The balance of the composition can comprise water to make up the 100% weight.

In some embodiments, the soluble salt of a group IA metal or of a group IIA metal of the periodic table can be a combination of any suitable salt of a group IA metal or of a group IIA metal of the periodic table as well known to those skilled in the art, such as those metals that appear in columns IA or IIA of the chemical periodic table, as well known to those skilled in the art, with any suitable organic or mineral acid as well known to those skilled in the art, Suitable examples can include sulphuric acid, hydrochloric acid and nitric acid as mineral acids, whereas suitable organic acids can include acetic acid, boric acid, citric acid and formic acid. Other suitable mineral or organic acids can include those described in U.S Patent Nos. 3,085,916 and 3,860,526, incorporated by reference herein, the suitable selection of which can obviously be determined by those skilled in the art. The balance of the composition can comprise water to make up the 100% weight.

In some embodiments, the composition can be manufactured by first combining the polymer and the salt of a group IA metal or of a group IIA metal of the periodic table, both of which can be in solid granular or powder form, and then mixing them with the organic or mineral acid and water. In other embodiments, the salt of a group IA metal or of a group IIA metal of the periodic table can be mixed with the acid and water, and then add the polymer to the mixture.

In further embodiments, the composition can be manufactured by first combining the polymer with the soluble salt of a group IA metal or of a group IIA element of the periodic table, and then adding the balance of water. In yet further embodiments, the composition can be manufactured by first mixing the soluble salt of a group IA metal or of a group IIA metal of the periodic table with the water, and then adding the polymer.

In any of the manufacturing methods described herein, the resultant mixtures of the components of the composition can then react with each other, which can further result in the mixture setting or curing into a solid or gelatinous form. Once the components of the composition have been mixed together, there can be a working time ranging from anywhere from approximately 2 to 10 minutes to affix the shape of the composition after which the shape composition can become set or cured.

In terms of the methods of manufacture relating to whether the last component added to the mixture to form the composition is water or the polymer, it has been observed that the choice of which can result in the polymer being more soluble or less soluble. For example, if the water is the last component added to a mixture of polymer and salt of a group IA metal or of a group IIA metal of the periodic table, it is observed that the resulting composition is less soluble in terms of releasing the polymer. If the polymer is the last component added to a mixture of the soluble salt of a group IA metal or of a group IIA metal of the periodic table, it is observed that the resulting composition is more soluble in terms of releasing the polymer. The choice of manufacture can be made in respect of the application for the composition. If the composition is to be used in a closed-loop system where liquids are recirculated through the composition, then using a composition whose polymer is less soluble may be preferable to prevent the composition being consumed or dissolved too rapidly. If the composition is to be used in an open-loop system where liquids pass through the composition once, then using a composition whose polymer is more soluble may be preferable to introduce the polymer into the liquids at a predetermined or desired rate.

Figure 1:
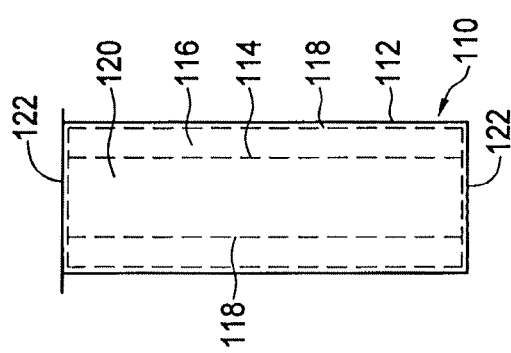
FIG. 1 is a side elevation view depicting a cartridge comprising a composition for use in flocculating solids suspended in liquids.

Referring to FIG. 1, one embodiment of a cartridge for use with the compositions and methods of use described herein is illustrated. In some embodiments, cartridge 110 can comprise outer sidewall 112 and inner sidewall 114 with composition 116 disposed therebetween. Composition 116 can comprise the composition described herein for use in settling solids suspended in liquids. Cartridge 110 can further comprise openings 122 at either end thereof, and can further comprise passageway 120 extending through cartridge 110 between openings 122. In some embodiments, sidewalls 112 and 114 can further comprise perforations 118.

In manufacturing cartridge 110, composition 116 can be prepared using any of the manufacturing methods described above, and then poured or placed into a mould to affix the final desired shape for composition 116 for cartridge 110.

Figure 2:
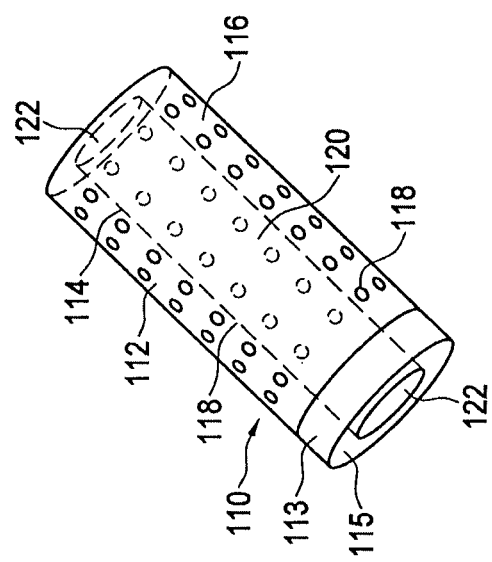
FIG. 2 is a perspective view depicting an alternate embodiment of the cartridge of FIG. 1.

Referring to FIG. 2, one embodiment of cartridge 110 is shown. In some embodiments, cartridge 110 can comprise cylindrical outer sidewall 112 and cylindrical inner sidewall 114 operatively coupled or attached to end cap 113 comprising bottom 115 and sidewall 117 extending substantially perpendicular or orthogonal therefrom, with opening 122 disposed therethrough on bottom 115 to passageway 120. Sidewalls 112 and 114 can further comprise perforations 118 disposed therethrough to provide access or communication to composition 116 disposed between sidewalls 112 and 114.

In some embodiments, cartridge 110 can be placed in a reactor for use in flocculating and/or settling solids suspended in liquids. In some embodiments, sidewalls 112 and 114 and end cap 113 can be comprised of metal or other suitable material as obvious to those skilled in the art. In some embodiments, sidewalls 112 and 114 can be welded or otherwise attached or fastened to end cap 113. In other embodiments, sidewalls 112 and 114 and end cap 113 can be formed as a singular, integral unit. In some embodiments, sidewalls 112 and 114 and end cap 113 can be circular in cross-section as can be reactor housing 124, as illustrated in the figures, although it is obvious to those skilled in the art that sidewalls 112 and 114, end cap 113 and reactor housing 124 can comprise any suitable or functionally equivalent shape in cross-section, which can include elliptical or oval, triangular, rectangular or polygonal shapes (not shown).

Referring to FIG. 3, cartridge is shown disposed in reactor housing 124. For the purposes of illustration only, reactor housing 124 is shown in FIG. 3 in an inverted configuration wherein outlet 128 is exiting from the top of reactor housing 124. In some embodiments, reactor housings 124 can be configured such that outlet 128 is on the bottom, and inlet 126 is disposed near the bottom of reactor housing 124. In other embodiments, reactor housings 124 can be configured as shown in FIG. 3.

In some embodiments, housing 124 can comprise inlet 126 to receive liquids containing suspended solids, and outlet 128 to allow the liquids to exit housing 124. In further embodiments, inlet 126 can comprise a tangential inlet wherein liquids entering housing 124 can circulate within housing 124 in a vortex or spiral path around the outside of sidewall 112 of cartridge 110 before entering passageway 120 and passing therethrough to outlet 128. The number of perforations 118 disposed through sidewalls 112 and 114, and their diameter and their spacing relative to each other, can be selected as a matter of design choice by those skilled in the art to adjust the amount of composition 116 that is exposed to liquids flowing through housing 124 having regard to the volume of liquids that can be held by housing 124 and the rate of flow of liquids flowing through housing 124. As liquids pass through housing 124, the liquids can contact composition 116 through perforations 118. In some embodiments, composition 116 can dissolve when liquids flowing through housing 124 contact composition 116. When dissolved in the liquids, composition 116 can contact the solids suspended in liquids and cause the solids to settle out. In some embodiments, the range of open area that perforations 118 provide on sidewalls 112 and 114 can range from approximately 20% to 80% open area. By adjusting the open area of perforations 118, the rate at which composition 116 can be contacted by liquids flowing through housing 124 and dissolve therein can be controlled. In the illustrated embodiment, housing 124 is shown as a cylindrical enclosure. In this embodiment, cartridge 110 can comprise an outer and inner concentric tubes to form sidewalls 112 and 114, respectively, although it is obvious to those skilled in the art that the physical configuration of housing 124, and cartridge 110 and sidewalls 112 and 114 contained therein can, be adapted to any other physical configuration that can accommodate the flow of liquids therethrough. In the manufacture of cartridge 110 as shown in FIG. 1, 2 or 3, composition 116 can be prepared using any of the manufacturing methods described above, and then poured or placed between the outer and inner concentric tubes that form sidewalls 112 and 114 until composition 116 has set or cured.

Figure 4:
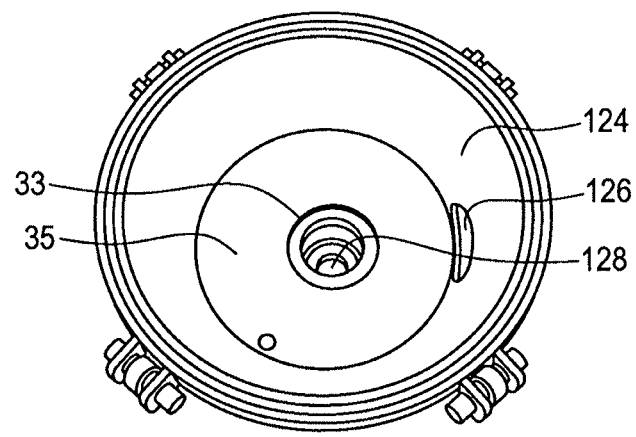
FIG. 4 is a perspective view depicting the interior of an empty reactor housing.
Figure 5:
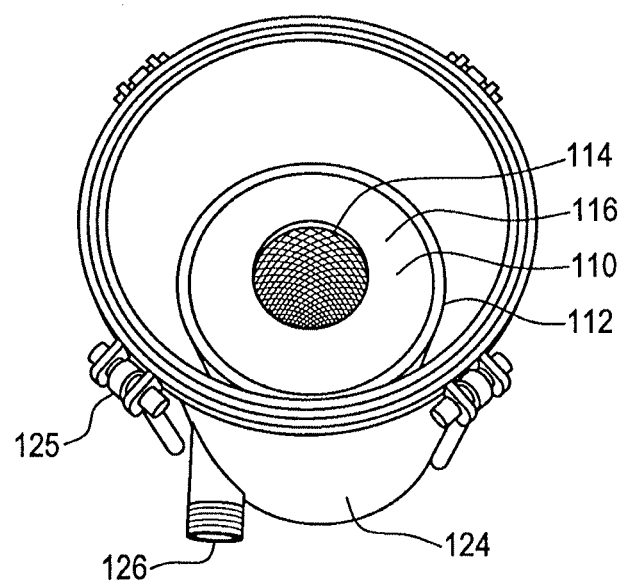
FIG. 5 is a perspective view depicting the cartridge of FIG. 1 or 2 installed in the reactor housing of FIG. 4.
Figure 6:
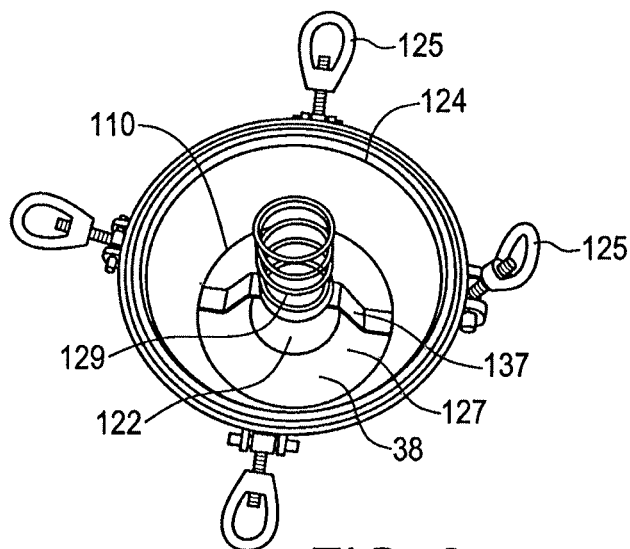
FIG. 6 is a perspective view depicting the reactor housing of FIG. 5 with a spring cap placed on the cartridge.
Figure 9:
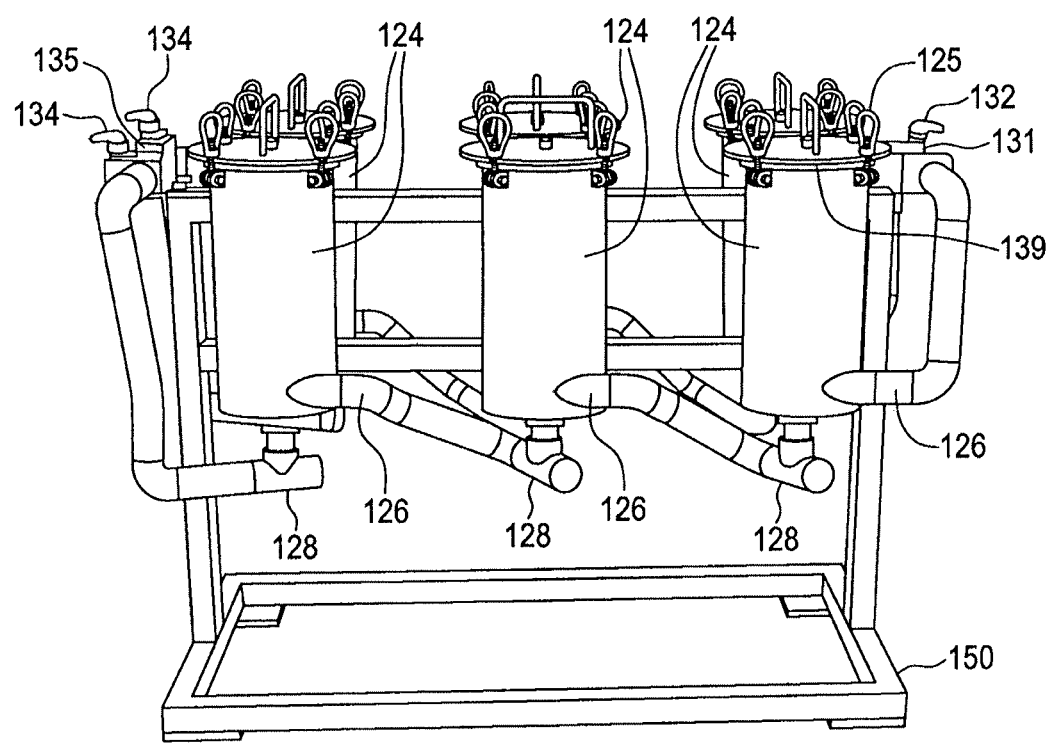
FIG. 9 is a perspective view depicting six reactors of FIG. 3 in a series-parallel configuration.

Referring to FIGS. 4, 5 and 6, one embodiment of reactor housing 124 is shown in various stages when fitting a cartridge 110 therein. In FIG. 4, reactor housing 124 is shown in an empty state. In some embodiments, reactor housing 124 can comprise bottom surface 35 and lip 33, which can be configured to receive opening 122 disposed on bottom 115 of cartridge 110, as shown in FIG. 2. In FIG. 5, a cartridge 110 is placed within reactor housing 124. In FIG. 6, spring cap 127 is placed on top of cartridge 110. Spring cap 127 can comprise base plate 38, which can further an opening to provide communication to opening 122 of cartridge 110, and spring bracket 137 and biasing means 129 disposed thereon wherein spring bracket 137 can be configured to position biasing means 129 in an elevated position with respect to cartridge 110 so as to provide access to opening 122. When lid 139 is placed on and secured to reactor housing 124 with latches 125 (as shown in FIG. 9), biasing means 129 can be compressed to, in combination with spring cap 127, bias cartridge 110 towards bottom surface 35 to hold, or otherwise support, cartridge 110 in place within reactor housing 124. In some embodiments, biasing means 129 can comprise a coil spring although it is obvious to those skilled in the art that any other functionally equivalent means can be used, such as compressible elastomeric materials, foam rubber, a compressible bladder filled with air or other suitable gas or gases, or any combination thereof.

Figure 7:
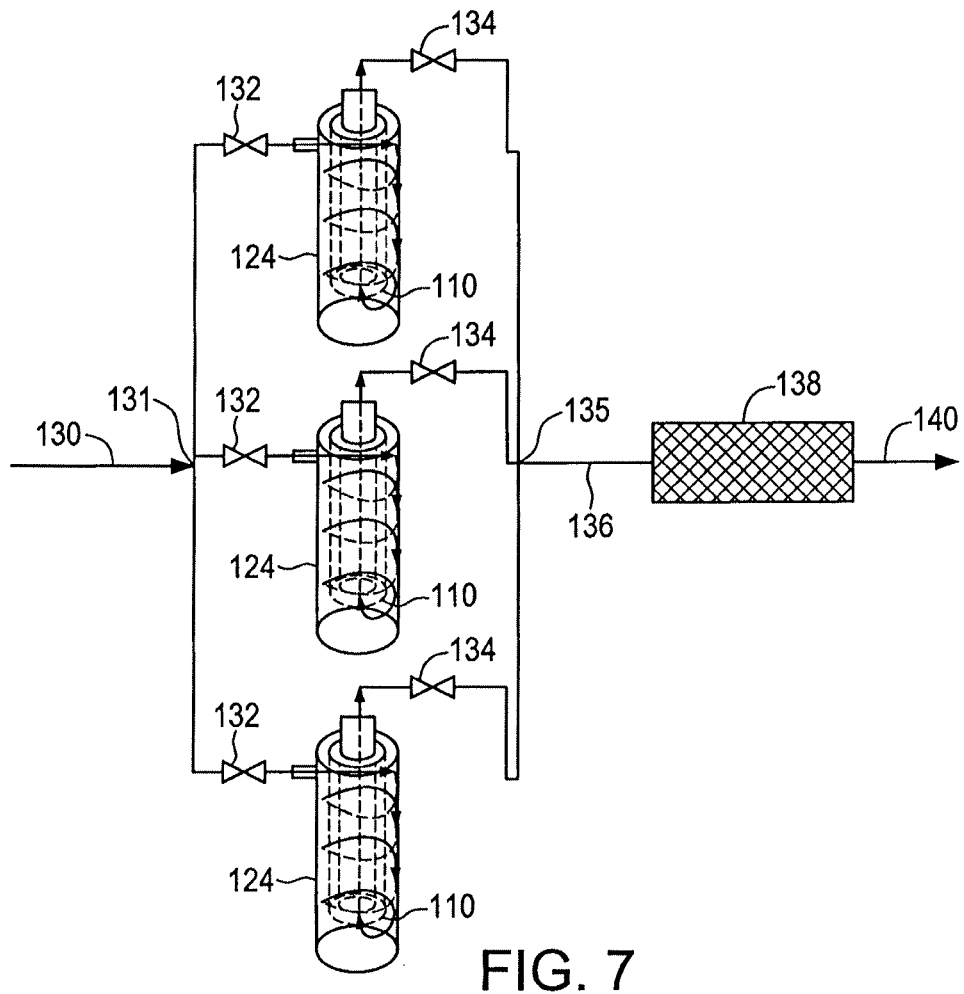
FIG. 7 is a schematic depicting a plurality of reactors of FIG. 3 in a parallel configuration, the reactors shown in an inverted configuration.

In some embodiments, a plurality of reactor housings 124 can be combined together in a system to increase the amount of liquids that can be treated to flocculate or settle suspended solids therefrom. Referring to FIG. 7, a plurality of housings 124 can be combined together in a parallel configuration. In this configuration, incoming liquid stream 130 can enter inlet manifold 131 and be directed to one of a plurality of inlet valves 132 prior to entering one of a plurality of housings 124. Liquids exiting each housing 124 can pass through one of a plurality of outlet valves 134 before being combined at outlet manifold 135 and exiting as outgoing stream 136. In some embodiments, inlet and outlet valves 132 and 134 can be used to stop the flow of liquids through a particular housing 124. The need to stop the flow of liquids through one or more housings 124 can be related to amount of liquids to be treated or processed. One or more housings 124 can be "turned off" by closing valves 132 and 134 for those housings 124 if the volume of liquids to be treated or processed or reduced. In other circumstances, any particular housing 124 can be "turned off" by closing valves 132 and 134 to allow the particular housing 124 to be repaired or to replace cartridge 110 contained therein if all of the composition 116 in disposed cartridge 110 has been dissolved or consumed. After replacing cartridge 110 in housing 124 with a new cartridge, housing 124 can then be returned to service by opening valves 132 and 134 after the new cartridge has been installed. In some embodiments, outgoing stream 136 can empty into a settling pond or tank to allow solids to settle.

Figure 8:
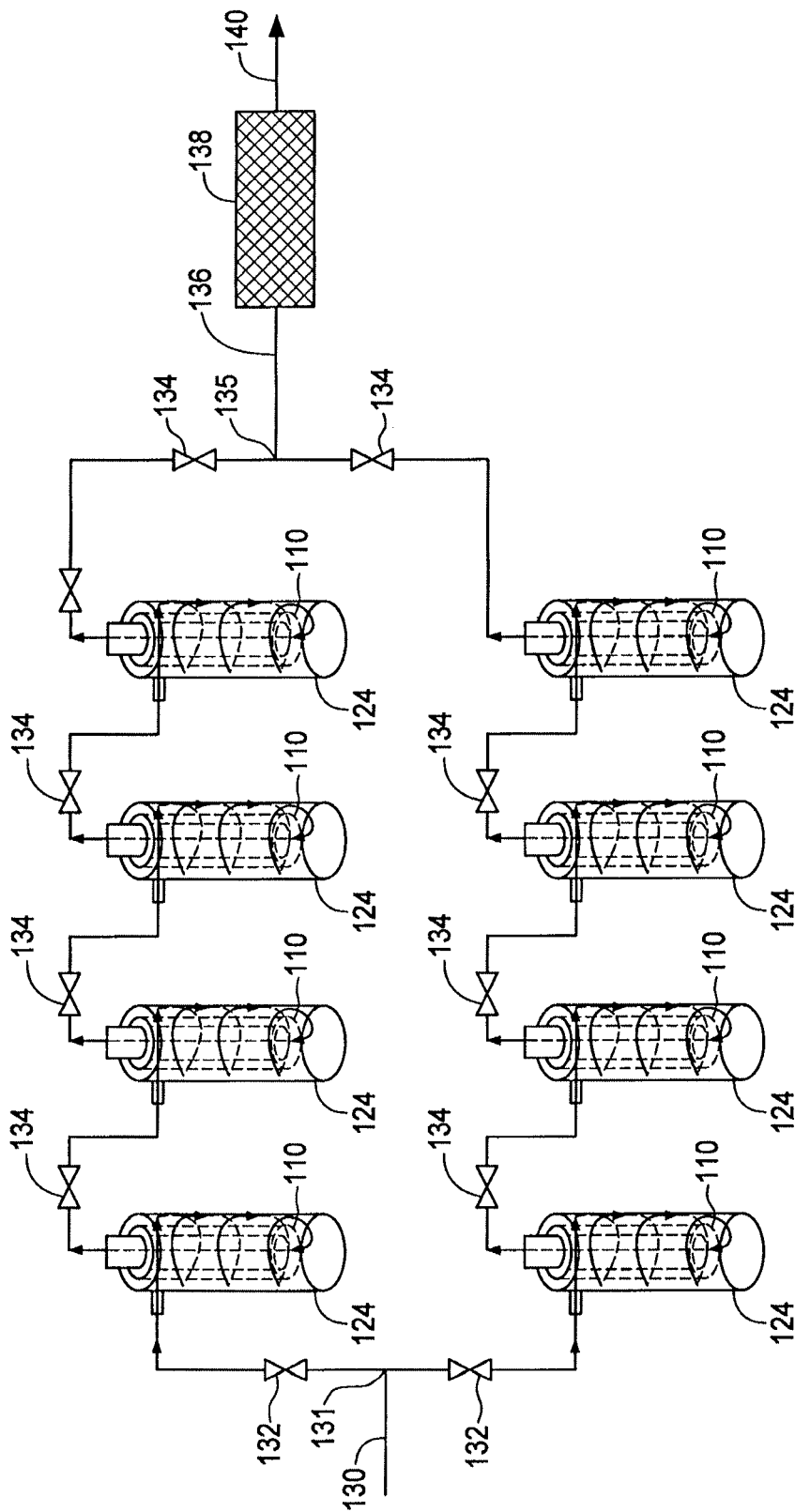
FIG. 8 is a schematic depicting a plurality of reactors of FIG. 3 in a series-parallel configuration, the reactors shown in an inverted configuration.

In other embodiments, a plurality of housings 124 can be configured in a series/parallel configured as shown in FIG. 8. In this configuration, there can be two or more parallel streams of two or more housings 124 connected in series. Incoming stream 130 can enter inlet manifold 131 and pass through one of a plurality of inlet valves 132 to enter a series stream of housings 124. In each series stream, liquid exiting one housing 124 can pass through an outlet valve 134 before entering the next housing 124. Liquid exiting the last housing 124 of a series stream can pass through another outlet valve 134 before being combined with other series streams at outlet manifold 135 before exiting the whole system as outgoing stream 136. In some embodiments, outgoing stream 36 can empty into a settling pond or tank to allow solids to settle.

For the purposes of illustration only, the systems shown in FIGS. 7 and 8 are illustrated in an inverted configuration wherein outlets 128 exit from the top of reactor housings 124. In some embodiments, reactor housings 124 can be configured such that outlets 128 are disposed on the bottom thereof, and inlets 126 are disposed near the bottom of reactor housings 124. In other embodiments, reactor housings 124 can be configured as shown in these figures.

Referring to FIG. 9, six reactor housings 124 are shown mounted on frame 150 in a series-parallel configuration, similar to as shown in FIG. 8. In this illustrated embodiment, two parallel streams of three reactor housings 124 connected in series are shown.

In further embodiments of either of the representative embodiments shown in FIG. 7 or 8, outgoing stream 136 can pass through filtration medium 138 to filter out solids that have clumped together as a result of contacting dissolved composition 116 after passing through reactor housings 124, thereby resulting in clarified stream 140. In some embodiments, filtration medium 138 can comprise burlap and/or other filtration materials or media, alone or in combination, as well known to those skilled in the art.

In some embodiments, one or more cartridges 110 can be used in a reaction tank such as described in U.S. patent application Ser. No. 12/237,653 (published Dec. 10, 2009), which is incorporated in this application in its entirety.

In some embodiments, the compositions and methods described herein can be used to flocculate or settle solids suspended in storm water, accumulated water at construction sites, mine waste water and industrial tailings, and other general inflow applications such as rivers, canals, creeks, ponds and others as obvious to those skilled in the art.

In some embodiments, the compositions and methods described herein can be used to flocculate or settle solids suspended in wastewater effluent, such as black water and grey water applications, and others as obvious to those skilled in the art.

In some embodiments, the compositions and methods described herein can be used to flocculate or settle solids suspended in drilling fluids used in the drilling of wells and in other drilling operations as obvious to those skilled in the art. In other embodiments, the compositions and methods described herein can be used to flocculate or settle solids suspended in water used in the initial drilling of wells before a first formation of oil or gas is hit with the drilling operation. In these embodiments, the water used in such drilling can be clarified and reused in the drilling process.

Figure 10:
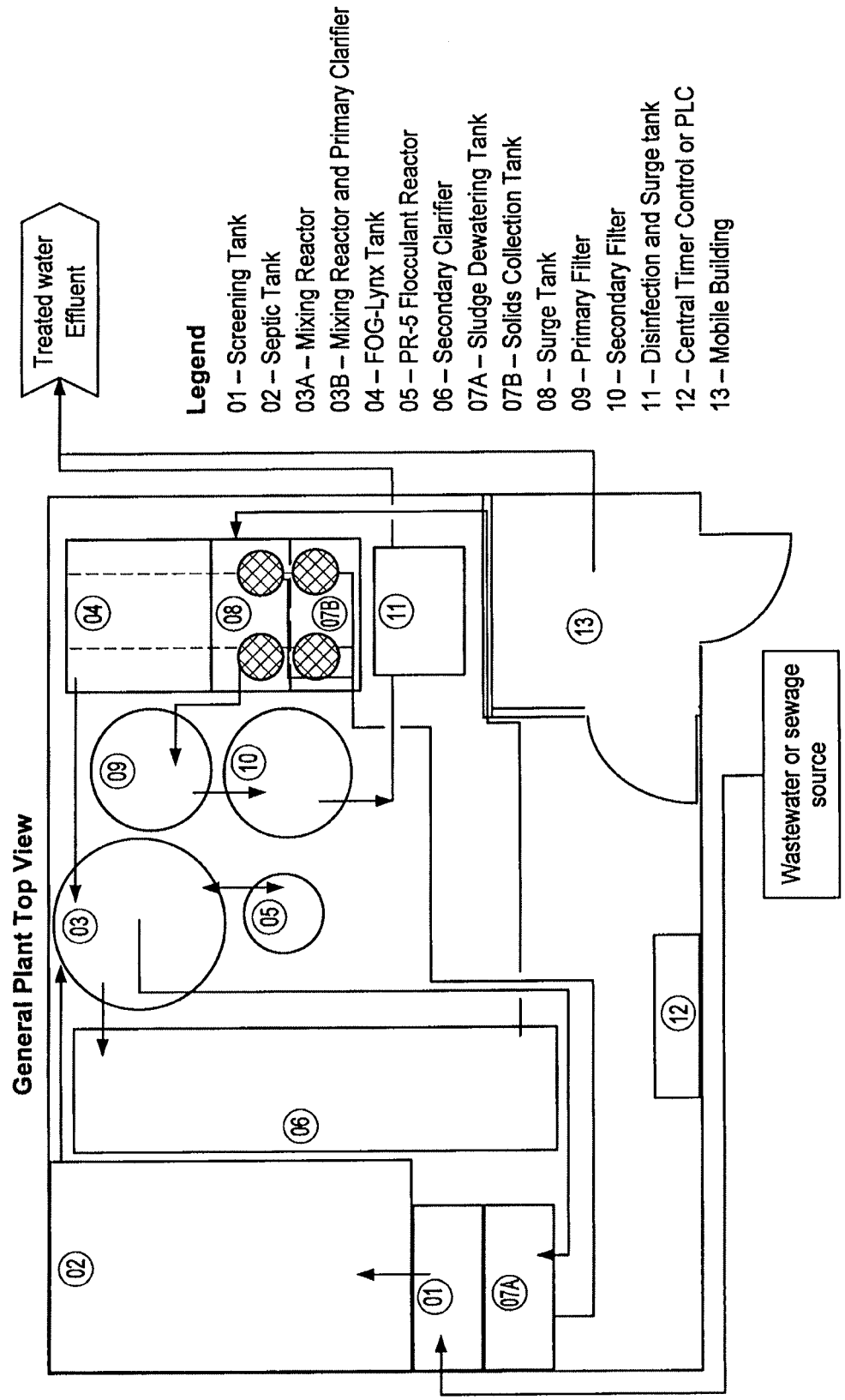
FIG. 10 is a block diagram depicting one embodiment of system for treating water or sewage.

In some embodiments, a system and method is provided for treating water comprising suspended solids and, in further embodiments, for treating sewage. Referring to FIG. 10, a block diagram of one embodiment of a system for treating water or sewage is shown. In some embodiments, the system can comprise screening tank 01 for receiving water or sewage from a source of the same, and screen out or filter large particles or solids disposed in the water or sewage; at least one septic tank 02 for receiving screened water or sewage; primary clarifier 03; flocculant tank 04 for holding a first flocculant that can be injected or metered into primary clarifier 03; secondary clarifier 06 for receiving clarified water or sewage from primary clarifier 03; surge tank 08 for receiving further clarified water or sewage from secondary clarifier 06; primary filter 09 for receiving further clarified water or sewage from surge tank 08; secondary filter 10 for receiving filtered water or sewage from primary filter 09; and disinfection and surge tank 11 for receiving filter water or sewage from secondary filter 10 to disinfect the clarified and filtered water or sewage to produce treated water or sewage effluent. In some embodiments, the first flocculant can comprise FOGT™-Lynx™ floccuant as manufactured by Clearflow Enviro Systems Group Inc. of Sherwood Park, Alberta, Canada that is configured to treat domestic or commercial waste-water streams comprising fat, oil and/or grease, which can reduce the chemical oxygen demand ("COD"), the biochemical oxygen demand ("BOD") and turbidity of effluent water. In some embodiments, the system can further comprise flocculant reactor 05, operatively coupled to primary clarifier 03 and configured to receive water or sewage from primary clarifier 03 and allow the water or sewage to react or mix with a second flocculant disposed in flocculant reactor 05 and return the water or sewage to primary clarifier 03. In some embodiments, floccument reactor 05 can comprise a PR-5™ flocculant reactor, as manufactured by Clearflow Enviro Systems Group Inc., supra. In some embodiments, the flocculant used in flocculant reactor 05 can comprise the flocculant composition disclosed in U.S. Provisional Patent Application No. 61/433,433 filed Jan. 17, 2011, which is incorporated by reference into this application in its entirety.

In some embodiments, the system can further comprise sludge dewatering tank 07A configured to receive settled solids from one or both of primary clarifier 03 and secondary clarifier 06, and to allow such solids to settle further. In some embodiments, the system can further comprise solids collection tank 07B configured to receive the settled solids from sludge dewatering tank 07A where water can further be removed from the solids.

In some embodiments, the system can further comprise controller 12 to control the operation of the system. In some embodiments, controller 12 can comprise a general purpose computer or microcontroller, a programmable logic controller ("PLC") or any other functionally equivalent controller as known and obvious to those skilled in the art to control the operation of the system to treat water or sewage comprising suspended solids. In some embodiments, the system can be disposed in a trailer that can be transported by a vehicle to any location where water or sewage is to be treated. In other embodiments, the system can be disposed in a standard 8' by 8' by 20' shipping container wherein the system can be transported to any location by any means configured to transport such shipping containers as well known to those skilled in the art. In some embodiments, the system can be scaled larger or smaller in size and/or fluid-handling capacity as necessary or required for any particular application, as obvious to those skilled in the art.

Figure 11:
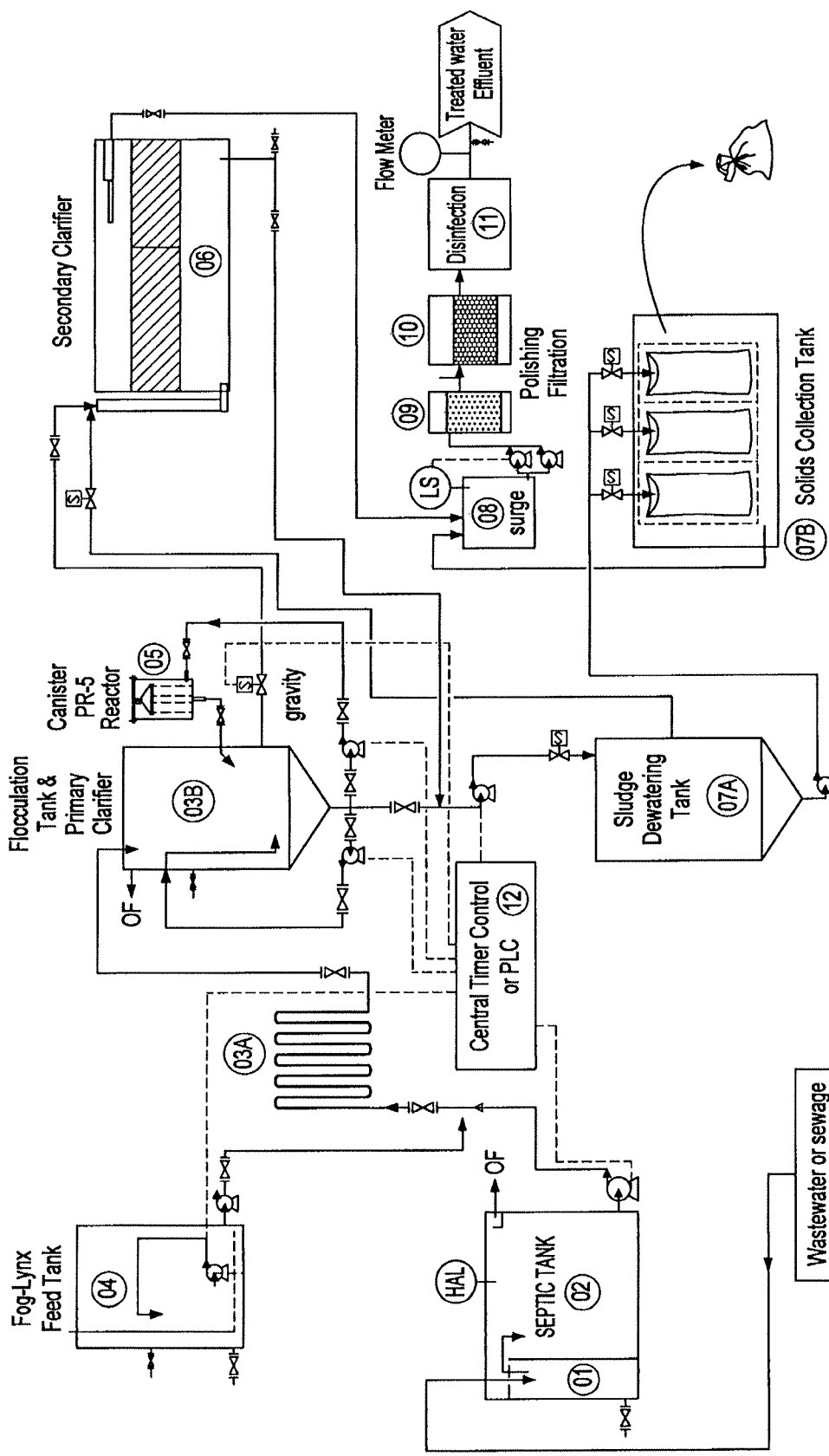
FIG. 11 is a schematic depicting another embodiment of the system of FIG. 10.

Referring to FIG. 11, an alternate embodiment of the system is shown. In some embodiments, screening tank 01 and septic 02 can be disposed in a single tank unit wherein water or sewage can be pumped therefrom to mixing reactor 03A. Flocculant from flocculant tank 04 can be pumped therefrom and mixed with the water or sewage prior to entering mixing reactor 03A. In some embodiments, the flocculant can comprise FOGT™-Lynx™ flocculant as manufactured by Clearflow Enviro Systems Inc., supra. In some embodiments, mixing reactor 03A can comprise a FOGT™-Lynx™ reactor as manufactured by Clearflow Enviro Systems Inc., supra. Water or sewage can pass through mixing reactor 03A in primary clarifier 03B wherein at least some of the suspended solids disposed in the water or sewage can settle therein. In some embodiments, primary clarifier 03B can further comprise a pump to draw water or sewage from the bottom of primary clarifier 03B and reintroduce the water or sewage near the top of primary clarifier 03B. In some embodiments, the system can comprise flocculant reactor 05 wherein a pump can draw water or sewage from the bottom of primary clarifier 03B and pump it through flocculant reactor 05 and then back into primary clarifier 03B. In some embodiments, a pump can be used to draw water or sewage from primary clarifier 03B and pump it to secondary clarifier 06. Clarified water or sewage disposed in secondary clarifier 06 can then feed into surge tank 08 wherein the clarified water or sewage can be pumped through one or more filters. In some embodiments, the system can pump clarified water or sewage from surge tank 08 through one or more filters. In the illustrated embodiment, the system can pump clarified water or sewage from surge tank 08 through primary filter 09 and then through filter 10 into disinfection and surge tank 11 wherein the clarified water or sewage can be disinfected to produce treated water or sewage effluent. In some embodiments, the filter media used in either or both of primary filter 09 and secondary filter 10 can comprise one or more of the following media: sand, zeolites, bentonites, anthracites, activated carbon or any other functionally equivalent filter media that can adsorb organic and/or inorganic substances as well known to those skilled in the art.

As shown and described in FIG. 10, the embodiment shown in FIG. 11 can also comprise sludge dewatering tank 07A that can receive settled solids from one or both of primary clarifier 03B and secondary clarifier 06 wherein the solids can further settle in sludge dewatering tank 07A and then drawn off from the bottom thereof and pumped to solids collection tank 07B. In solids collection tank 07B, water can be removed from the settled solids and pumped into surge tank 08, and the dry solids can be removed and disposed of as well known to those skilled in the art.

In some embodiments, the system can comprise controller 12 to control the operation of the system, including the operation of the pumps and valves as shown in FIG. 11, to control the flow of water or sewage through the elements of the system from screening tank 01 to disinfection and surge tank 11. In some embodiments, controller 12 can comprise a general purpose computer or microcontroller, a PLC or any other functionally equivalent controller as known and obvious to those skilled in the art to control the operation of the system to treat water or sewage comprising suspended solids.

Figure 12:
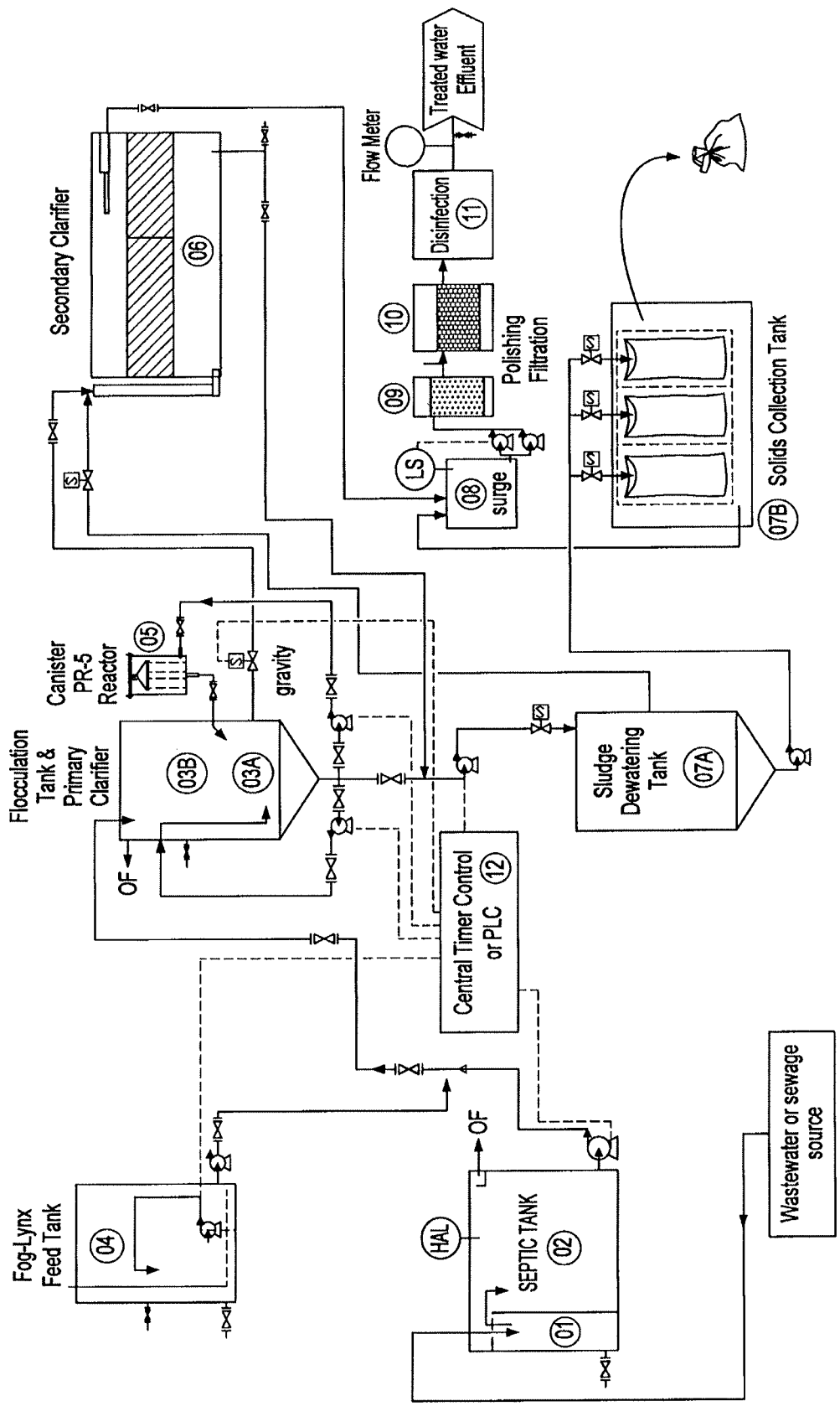
FIG. 12 is a schematic depicting a third embodiment of the system of FIG. 10.

In this embodiment, mixing reactor 03A can be a separate component of the system from that of primary clarifier 03B. In other embodiments, mixing reactor 03A can be disposed in primary clarifier 03B, as illustrated in FIG. 12.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A system for treating waste water comprising suspended solids, the system comprising:
   a) a screening tank configured to receive the waste water;
   b) at least one septic tank configured to receive the waste water from the screening tank;
   c) a mixing reactor configured to receive the waste water from the at least one septic tank;
   d) a flocculant tank configured to inject a first flocculant into the mixing reactor wherein the first flocculant mixes with the waste water, wherein the first flocculant comprises:
      I) a polymer flocculant comprising a high molecular weight, in a proportion of approximately 10% to 70% by weight,
      ii) a soluble salt of a group IA metal or a soluble salt of a group IIA metal, in a proportion of approximately 0.5% to 35% by weight, and
      iii) water;
   e) a primary clarifier configured to receive the waste water mixed with the flocculent from the mixing reactor wherein at least some of the suspended solids disposed in the waste water settle in the primary clarifier to produce first clarified waste water and first settled solids;
   f) a secondary clarifier configured to receive the first clarified waste water from the primary clarifier wherein at least some of the suspended solids disposed in the first clarified waste water settle in the secondary clarifier to produce second clarified waste water and second settled solids;
   g) a surge tank configured to receive the second clarified waste water from the secondary clarifier; and
   h) at least one filter tank configured to receive the second clarified waste water from the surge tank wherein the second clarified waste water is filtered to produce treated waste water.

2. The system as set forth in claim 1, further comprising a flocculent reactor operatively connected to the primary clarifier wherein at least some of the waste water disposed in the primary clarifier passes through the flocculant reactor to react or mix with a second flocculent before it is fed back into the primary clarifier.

3. The system as set forth in claim 2, wherein the second flocculant comprises the first flocculant.

4. The system as set forth in claim 1, further comprising a disinfection and surge tank configured to receive the treated waste water from the at least one filter tank wherein the treated waste water is disinfected.

5. The system as set forth in claim 1, further comprising a sludge storage tank configured to receive one or both of the first settled solids from the primary clarifier and the second settled solids from the secondary clarifier.

6. The system as set forth in claim 5, further comprising a sludge dewatering tank configured to receive settled solids from the sludge storage tank and to remove water from the settled solids.

7. The system as set forth in claim 1, wherein the water of the first flocculant is in a proportion to make up the balance of 100% weight.

8. The system as set forth in claim 1, wherein the soluble salt is a combination of a salt of the group IA metal or a salt of the group IIA metal and an organic acid or a mineral acid.

9. A method for treating waste water comprising suspended solids, the method comprising the steps of:
  a) passing the waste water through a screening tank;
  b) passing the screened waste water through at least one septic tank;
  c) passing the screened waste water from the septic tank through a mixing reactor;
  d) injecting a first flocculent into the mixing reactor wherein the first flocculant mixes with the screened waste water, wherein the first flocculent comprises:
    I) a polymer flocculent comprising a high molecular weight, in a proportion of approximately 10% to 70% by weight,
    ii) a soluble salt of a group IA metal or a soluble salt of a group IIA metal, in a proportion of approximately 0.5% to 35% by weight, and
    iii) water;
  e) passing the screened waste water from the mixing reactor through a primary clarifier wherein at least some of the suspended solids disposed in the screened waste water settle in the primary clarifier to produce first clarified waste water and first settled solids;
  f) passing the first clarified waste water through a secondary clarifier wherein at least some of the suspended solids disposed in the first clarified waste water settle in the secondary clarifier to produce second clarified waste water and second settled solids;
  g) passing the second clarified waste water through a surge tank; and
  h) passing the second clarified waste water through at least one filter tank wherein the second clarified waste is filtered to produce treated waste water.

10. The method as set forth in claim 9, further comprising the step of passing at least some of the screened waste water disposed in the primary clarifier through a flocculant reactor to react or mix with a second flocculant before passing back into the primary clarifier.

11. The method as set forth in claim 10, wherein the second flocculant comprises the first flocculant.

12. The method as set forth in claim 9 further comprising the step of passing the treated waste water through a disinfection and surge tank wherein the treated waste water is disinfected.

13. The method as set forth in claim 9, further comprising the step of passing one or both of the first settled solids from the primary clarifier and the second settled solids from the secondary clarifier to a sludge storage tank.

14. The method as set forth in claim 13, further comprising the step of removing water from the settled solids disposed in the sludge storage tank.

15. The method as set forth in claim 9, wherein the water of the first flocculant is in a proportion to make up the balance of 100% weight.

16. The method as set forth in claim 9, wherein the soluble salt is a combination of a salt of the group IA metal or a salt of the group IIA metal and an organic acid or a mineral acid.

17. A system for treating sewage comprising suspended solids, the system comprising:
  a) a screening tank configured to receive the sewage;
  b) at least one septic tank configured to receive the sewage from the screening tank;
  c) a mixing reactor configured to receive the sewage from the at least one septic tank;
  d) a flocculant tank configured to inject a first flocculant into the mixing reactor wherein the first flocculant mixes with the sewage, wherein the first flocculent comprises:
    I) a polymer flocculent comprising a high molecular weight, in a proportion of approximately 10% to 70% by weight,
    ii) a soluble salt of a group IA metal or a soluble salt of a group IIA metal, in a proportion of approximately 0.5% to 35% by weight, and
    iii) water;
  e) a primary clarifier configured to receive the sewage mixed with the flocculant from the mixing reactor wherein at least some of the suspended solids disposed in the sewage settle in the primary clarifier o produce first clarified sewage and first settled solids;
  f) a secondary clarifier configured to receive the first clarified sewage from the primary clarifier wherein at least some of the suspended solids disposed in the first clarified sewage settle in the secondary clarifier to produce second clarified sewage and second settled solids;
  g) a surge tank configured to receive the second clarified sewage from the secondary clarifier; and
  h) at least one filter tank configured to receive the second clarified sewage from the surge tank wherein the second clarified sewage is filtered to produce treated sewage.

18. The system as set forth in claim 17, further comprising a flocculant reactor operatively connected to the primary clarifier wherein at least some of the sewage disposed in the primary clarifier passes through the flocculant reactor to react or mix with a second flocculant before it is fed back into the primary clarifier.

19. The system as set forth in claim 18, wherein the second flocculant comprises the first flocculant.

20. The system as set forth in claim 17, further comprising a disinfection and surge tank configured to receive the treated sewage from the at least one filter tank wherein the treated sewage is disinfected.

21. The system as set forth in claim 17, further comprising a sludge storage tank configured to receive one or both of the first settled solids from the primary clarifier and the second settled solids from the secondary clarifier.

22. The system as set forth in claim 21, further comprising a sludge dewatering tank configured to receive settled solids from the sludge storage tank and to remove water from the settled solids.

23. The system as set forth in claim 17, wherein the water of the first flocculant is in a proportion to make up the balance of 100% weight.

24. The system as set forth in claim 17, wherein the soluble salt is a combination of a salt of the group IA metal or a salt of the group IIA metal and an organic acid or a mineral acid.

25. A method for treating sewage comprising suspend solids, the method comprising the steps of:
a) passing the sewage through a screening tank;
b) passing the screened sewage through at least one septic tank;
c) passing the screened sewage from the septic tank through a mixing reactor;
d) injecting a first flocculant into the mixing reactor wherein the first flocculant mixes with the screened sewage, wherein the first flocculent comprises:
  I) a polymer flocculant comprising a high molecular weight, in a proportion of approximately 10% to 70% by weight,
  ii) a soluble salt of a group IA metal or a soluble salt of a group IIA metal, in a proportion of approximately 0.5% to 35% by weight, and
  iii) water;
e) passing the screened sewage from the mixing reactor through a primary clarifier wherein at least some of the suspended solids disposed in the screened sewage settle in the primary clarifier to produce first clarified sewage and first settled solids;
f) passing the first clarified sewage through a secondary clarifier wherein at least some of the suspended solids disposed in the first clarified sewage settle in the secondary clarifier to produce second clarified sewage and second settled solids;
g) passing the second clarified sewage through a surge tank; and
h) passing the second clarified sewage through at least one filter tank wherein the second clarified waste is filtered to produce treated sewage.

26. The method as set forth in claim 25, further comprising the step of passing at least some of the screened sewage disposed in the primary clarifier through a flocculant reactor to react or mix with a second flocculant before passing back into the primary clarifier.

27. The method as set forth in claim 26, wherein the second flocculant comprises the first flocculant.

28. The method as set forth in claim 25, further comprising the step of passing the treated sewage through a disinfection and surge tank wherein the treated sewage is disinfected.

29. The method as set forth in claim 25, further comprising the step of passing one or both of the first settled solids from the primary clarifier and the second settled solids from the secondary clarifier to a sludge storage tank.

30. The method as set forth in claim 29, further comprising the step of removing water from the settled solids disposed in the sludge storage tank.

31. The method as set forth in claim 25, wherein the water of the first flocculant is in a proportion to make up the balance of 100% weight.

32. The method as set forth in claim 25, wherein the soluble salt is a combination of a salt of the group IA metal or a salt of the group IIA metal and an organic acid or a mineral acid.

33. A method for treating waste water comprising suspended solids, the method comprising the steps of:
a) screening the waste water;
b) passing the screened waste water through at least one septic tank;
c) mixing the screened waste water with a first flocculant after the screened waste water has passed through the at least one septic tank, wherein the first flocculant comprises:
  I) a polymer flocculant comprising a high molecular weight, in a proportion of approximately 10% to 70% by weight,
  ii) a soluble salt of a group IA metal or a soluble salt of a group IIA metal, in a proportion of approximately 0.5% to 35% by weight, and
  iii) water;
d) settling at least some of the suspended solids disposed in the screened waste water to produce first clarified waste water and first settled solids;
e) settling at least some of the suspended solids disposed in the first clarified waste water to produce second clarified waste water and second settled solids;
f) passing the second clarified waste water through a surge tank; and
g) filtering the second clarified waste water after the second clarified waste water has passed through the surge tank to produce treated waste water.

34. The method as set forth in claim 33, further comprising the step of reacting or mixing at least some of the screened waste water from the primary clarifier with a second flocculant before returning the at least some of the screened waste water to the primary clarifier.

35. The method as set forth in claim 34, wherein the second flocculant comprises the first flocculant.

36. The method as set forth in claim 33, further comprising the step of disinfecting the treated waste water.

37. The method as set forth in claim 33, further comprising the step of receiving one or both of the first settled solids and the second settled solids.

38. The method as set forth in claim 37, further comprising the step of removing water from the settled solids.

39. The method as set forth in claim 33, wherein the water of the first flocculant is in a proportion to make up the balance of 100% weight.

40. The method as set forth in claim 33, wherein the soluble salt is a combination of a salt of the group IA metal or a salt of the group IIA metal and an organic acid or a mineral acid.

41. A system for treating waste water comprising suspended solids, the system comprising:
a) a screening tank configured for screening the waste water;
b) at least one septic tank;
c) a mixing reactor configured for mixing the screened waste water with a first flocculant after the screened waste water has passed through the at least one septic tank, wherein the first flocculant comprises:
  I) a polymer flocculant comprising a high molecular weight, in a proportion of approximately 10% to 70% by weight,
  ii) a soluble salt of a group IA metal or a soluble salt of a group IIA metal, in a proportion of approximately 0.5% to 35% by weight, and
  iii) water;
d) a primary clarifier configured for settling at least some of the suspended solids disposed in the screened waste water to produce first clarified waste water and first settled solids;
e) a secondary clarifier configured for settling at least some of the suspended solids disposed in the first clarified waste water to produce second clarified waste water and second settled solids;

f) a surge tank; and
g) at least one filter tank configured for filtering the second clarified waste water to produce treated waste water.

42. The system as set forth in claim 41, further comprising a flocculant reactor configured for reacting or mixing at least some of the screened waste water with a second flocculant.

43. The system as set forth in claim 42, wherein the second flocculant comprises the first flocculant.

44. The system as set forth in claim 41, further comprising a disinfection and surge tank configured for disinfecting the treated waste water.

45. The system as set forth in claim 41, further comprising a sludge storage tank configured for receiving one or both of the first settled solids and the second settled solids.

46. The system as set forth in claim 41, wherein the water of the first flocculant is in a proportion to make up the balance of 100% weight.

47. The system as set forth in claim 41, wherein the soluble salt is a combination of a salt of the group IA metal or a salt of the group IIA metal and an organic acid or a mineral acid.

48. A method for treating sewage comprising suspended solids, the method comprising the steps of:
  a) screening the sewage;
  b) passing the screened sewage through at least one septic tank;
  c) mixing the screened sewage with a first flocculant after the screened sewage has passed through the at least one septic tank, wherein the first flocculent further comprises:
    I) a polymer flocculant comprising a high molecular weight, in a proportion of approximately 10% to 70% by weight,
    ii) a soluble salt of a group IA metal or a soluble salt of a group IIA metal, in a proportion of approximately 0.5% to 35% by weight, and
    iii) water;
  d) settling at least some of the suspended solids disposed in the screened sewage to produce first clarified sewage and first settled solids;
  e) settling at least some of the suspended solids disposed in the first clarified sewage to produce second clarified sewage and second settled solids;
  f) passing the second clarified sewage through a surge tank; and
  g) filtering the second clarified sewage after the second clarified sewage has passed through the surge tank to produce treated sewage.

49. The method as set forth in claim 48, further comprising the step of reacting or mixing at least some of the screened sewage from the primary clarifier with a second flocculant before returning the at least some of the screened sewage to the primary clarifier.

50. The method as set orth in claim 49, wherein the second flocculant comprises the first flocculant.

51. The method as set forth in claim 48, further comprising the step of disinfecting the treated sewage.

52. The method as set forth in claim 48, further comprising the step of receiving one or both of the first settled solids and the second settled solids.

53. The method as set forth in claim 52, further comprising the step of removing water from the settled solids.

54. The method as set forth in claim 48, wherein the water of the first flocculant is in a proportion to make up the balance of 100% weight.

55. The method as set forth in claim 48, wherein the soluble salt is a combination of a salt of the group IA metal or a salt of the group IIA metal and an organic acid or a mineral acid.

56. a system for treating sewage comprising suspended solids, the system comprising:
  a) a screening tank configured for screening the sewage;
  b) at least one septic tank;
  c) a mixing reactor configured for mixing the screened sewage with a first flocculant after the screened sewage has passed through the at least one septic tank, wherein the first flocculant further comprises:
    I) a polymer flocculant comprising a high molecular weight, in a proportion of approximately 10% to 70% by weight,
    ii) a soluble salt of a group IA metal or a soluble salt of a group IIA metal, in a proportion of approximately 0.5% to 35% by weight, and
    iii) water;
  d) a primary clarifier configured for settling at least some of the suspended solids disposed in the screened sewage to produce first clarified sewage and first settled solids;
  e) a secondary clarifier configured for settling at least some of the suspended solids disposed in the first clarified sewage to produce second clarified sewage and second settled solids;
  f) a surge tank; and
  g) at least one filter tank configured for filtering the second clarified sewage to produce treated sewage.

57. The system as set forth in claim 56, further comprising a flocculant reactor configured for reacting or mixing at least some of the screened sewage with a second flocculant.

58. The system as set forth in claim 57, wherein the second flocculant comprises the first flocculent.

59. The system as set forth in claim 56, further comprising a disinfection and surge tank configured for disinfecting the treated sewage.

60. The system as set forth in claim 56, further comprising a slundge storage tank configured for receiving one or both of the first settled solids and the second settled solids.

61. The system as set forth in claim 56, wherein the water of the first flocculant is in a proportion to make up the balance of 100% weight.

62. The system as set forth in claim 56, wherein the soluble salt is a combination of a salt of the group IA metal or a salt of the group IIA metal and an organic acid or a mineral acid.

* * * * *